Sept. 17, 1963 B. STREU 3,104,149

RECORDING APPARATUS

Filed Aug. 1, 1960 3 Sheets-Sheet 1

Sept. 17, 1963 B. STREU 3,104,149

RECORDING APPARATUS

Filed Aug. 1, 1960 3 Sheets-Sheet 2

Sept. 17, 1963 B. STREU 3,104,149

RECORDING APPARATUS

Filed Aug. 1, 1960 3 Sheets-Sheet 3

3,104,149

RECORDING APPARATUS

Benno Streu, Freiburg im Breisgau, Germany, assignor to Fritz Hellige & Co. G.m.b.H., Freiburg im Breisgau, Germany, a German company Filed Aug. 1, 1960, Ser. No. 46,842
Claims priority, application Germany Aug. 1, 1959
14 Claims. (Cl. 346—116)

The present invention relates to recording apparatus for recording movements of a recording arm such as, for example, a recording arm of a measuring instrument which receives signals in the form of variations in an electric current or voltage. The invention is particularly concerned with the type of recording apparatus employing edge recording, that is, apparatus in which the trace is recorded, not at the point of intersection of a straight line represented by the recording arm or pointer and the record surface as is the case with point recording, but at the point of intersection between a straight line, on the one hand, represented by an edge of the recording base, and the straight line, on the other hand, represented by the recording arm or pointer. As is well known, a record carrier can be used with advantage for rectangular co-ordinates. The record carrier is guided around the recording edge and receives there, due to the pressure of a recording arm or pointer, the trace to be recorded either by burning out, by melting a heat-sensitive wax layer, by chemical change of a layer involving a change of color or by transferring a color or pigment trace from a color or pigment carrier to the record carrier.

Since the recorded trace, however, is not produced directly on the edge, but on the tape-like record carrier running over it, the sharpness of the trace depends on the sharpness of the bend of the record carrier about the edge. The sharpness of the bend is itself determined by the inherent stiffness of the record carrier and the tension with which it is pulled across the edge. The sharper the edge and the less the internal stiffness of the paper is, the sharper the bend with which the record carrier is guided over the edge and the finer the recorded tracing becomes, independently of the selected recording method.

In the dry recording method wherein a color trace or a pigment trace is transferred from a color or pigment carrier to the record carrier, the circumstance that the color or pigment layer is located between the record carrier and the recording arm or pointer reduces the sharpness of the tracing thereby recorded. Therefore the use of very sharp guiding or recording edges and high paper tension is desirable, whereby, however, high external friction occurs on the guiding edge and the danger arises that the record carrier may break at this point. It is already known to reduce greatly the external friction by using a slim roller as a guiding edge over which the record carrier is traversed. However, other difficulties then occur and it is the object of the present invention to remove these difficulties.

The traversing mechanism of recording apparatus, constructed in accordance with the present invention and operating with tape recording, has a shin guide roller forming the recording edge and adapted to the tape-like record carrier and is characterised by at least one supporting or backing roller for the slim guide roller and rolling on the said guide roller. The supporting roller can fulfil its object correctly only if it is much thicker than the guide roller, i.e. is of a larger diameter.

As a result of these features the guide roller forming the recording edge can be made very slim, the external friction of the record carrier on the "edge" being negligibly small, the internal friction however remaining during the bending and also increasing with a sharper bend, a feature which then determines the lower limit for the diameter of the guide roller, apart from the fact that, for other reasons, its diameter cannot fall below a certain value. The tension necessary for the sharp bending of the record carrier, however, no longer leads to bending of the slim reversing roller—and this is the main object of the frictionless supporting arrangement of the present invention. In modern recording apparatus using several recording channels and tape-like record carriers of a width of 50 cm. and more, the bending of the guide roller could result not only in a breakdown in the movement of the record carrier, but also the lifting thereof from the recording arm or pointer or from the pigment or color carrier. The supporting or backing roller behind the guide roller receives all the forces originating from the tension of the record carrier, and being of a suitably strong construction it keeps the recording edge substantially straight.

The invention also results basically in an improvement in the quality of the recording obtained in all direct recording methods. It represents a decisive advance particularly in the dry direct recording method wherein a color or pigment tracing is transferred on to the record carrier. In order to compensate to some extent for the consequences upon the presence of a color or pigment carrier between the record carrier and the recording arm with regard to the other conditions at the recording edge the observance of very great accuracy is important.

The invention is further described by way of example with reference to the accompanying diagrammatic drawings in which.

Figure 1:
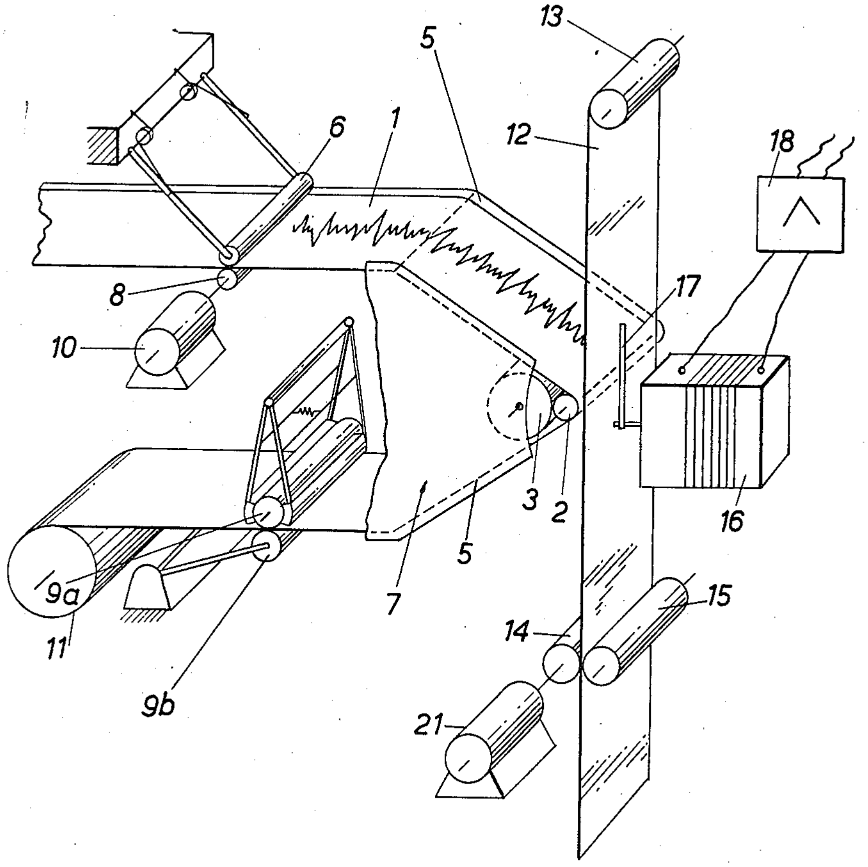
FIG. 1 is a schematic perspective view of the principal members of a recording apparatus constructed according to the invention.

A recording apparatus according to the invention is illustrated basically in FIG. 1 and is adapted for a dry recording method wherein a color tracing is transferred from a pigment or color carrier 12 to a record carrier 1. The apparatus comprises, as main parts, a traversing guide mechanism 7 and a measuring instrument 16 connected in series with an amplifier 18 for amplifying electrical signals to be recorded. The record carrier 1 which is calibrated for straight rectangular co-ordinates is unwound from a supply roll 11 and is fed to a guide roller 2 and guided around it with a sharp bend. For driving purposes an interlocked pair of rollers 6, 8 are used, the roller 8 of which is coupled to a motor 10 and the roller 6 of which is journalled so as to resiliently urge the record carrier 1 running between the rollers against the roller 8. A high recording quality requires a sharp bend across the edge 2 and a certain, not inconsiderable tension of the record carrier which, for example is produced by means of a pair of brake rollers 9*a*, 9*b* co-operating with the pair of driving rollers 6, 8. Secured to the shaft of the measuring instrument 16 is a recording arm 17. In the embodiment shown in FIG. 1, a direct dry recording method is used with transference of a color or pigment trace at the pressure point of the recording arm or pointer 17 from the color or pigment carrier 12 which is unwound from a supply roll 13 and traversed by a pair of rollers 14 and 15 driven from a motor 21.

The guide roller 2 serving as a recording edge is carried by a frame 5 of the mechanism 7 and supported, according to the present invention by a roller 3 of larger diameter. The roller 3 cannot sag or bow and therefore guide roller 2 can be constructed with a very small diameter. Because the supporting roller 3 runs oppositely to the record carrier on the guide roller 2, preferably the roller 3 and the angle of the bend in the record carrier about the roller 2 are chosen so that the latter is not in contact with the supporting roller 3.

Figure 2:
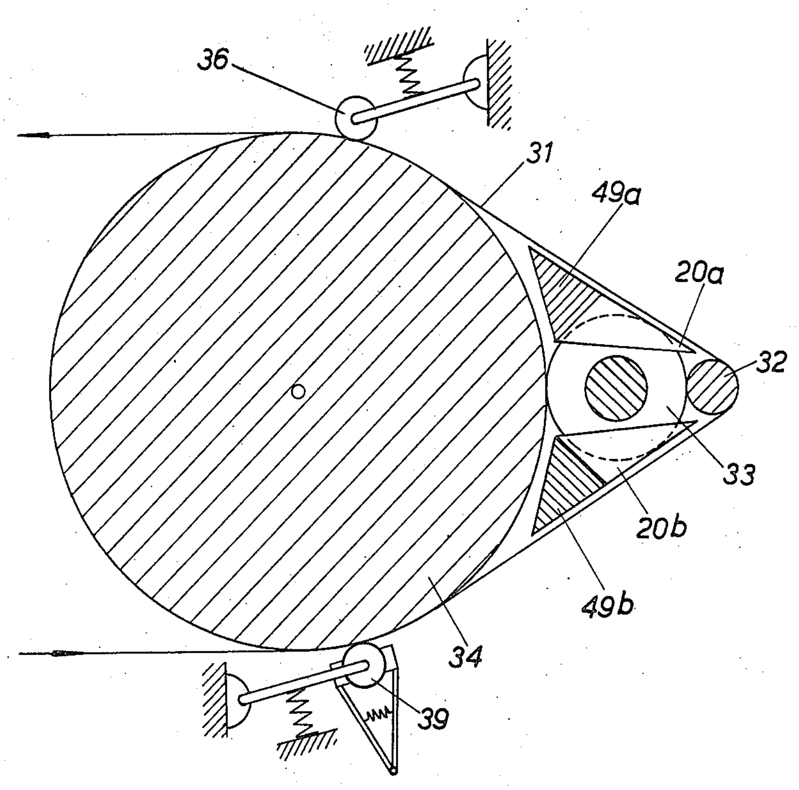
FIG. 2 is a detail cross section illustrating part of a second embodiment of the invention.
Figure 3:
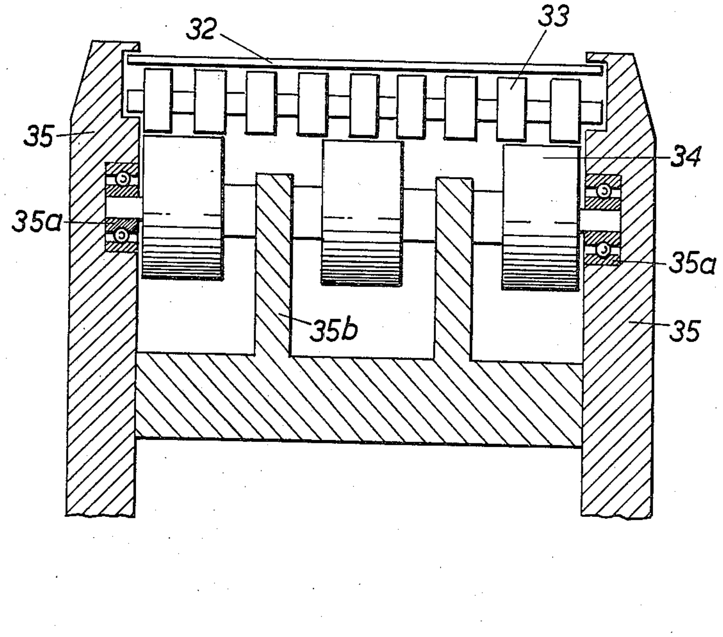
FIG. 3 is a sectional elevation to a smaller scale of the apparatus of FIG. 2.

In FIG. 2 parts of the apparatus which are similar to those of FIG. 1 have been omitted for the sake of clarity. In the embodiment of FIGS. 2 and 3 a record carrier 31, unwound from a reel (not shown) is traversed by a driving roller 36, driven by a motor (not shown), around a slim guide roller 32 providing a recording edge and is tensioned by a brake roller 39. A pair of supporting or backing rollers arranged in series is provided, the first of which, hereinafter called intermediate supporting roller 33, runs on the guide roller 32, and the second of which, hereinafter called main supporting roller 34, rolls on the intermediate supporting roller 33. The driving roller 36 and the brake roller 39 both co-operate with the main supporting or backing roller 34 and are spring biased theretowards, thus dispensing with second driving and backing rollers. A pigment carrier and a recording arm or pointer of a measuring instrument similar to the pigment carrier 12, the recording arm 17 and the instrument 16 of FIG. 1 but are omitted from FIGS. 2 and 3 for the sake of simplification of the drawings.

The object of the present invention is still achieved by divided supporting rollers 33, 34, as shown in FIG. 3. The weight of the supporting rollers in this case is greatly reduced. Naturally the individual parts of the divided rollers have a common shaft. Particularly in the case of the intermediate supporting roller 33 the division can be in the form of many grooves, preferably also with the object of reducing rolling difficulties which could be caused by dust on the paper. As shown in FIG. 2 a support 49*a* is provided, preferably between the two lateral frame members 35 and in the angle between the main supporting roller 34 and the intermediate supporting roller 33, and symmetrically thereto, on the other side a support 49*b*. The supports 49*a*, 49*b* serve to carry rigid supporting strips 20*a* and 20*b*. These strips limit any undesirable lateral deflection of the slim guide roller 32 upwardly or downwardly and can preferably extend through the grooves of the intermediate supporting roller 33. Alternatively the supports 49*a* and 49*b* may be provided with rake-like fingers or sliders for example by which the grooves in the intermediate supporting roller 33 are cleaned. The guide roller 32 and the supporting rollers 33 and 34 are rotatably mounted in the side members 35 of the frame of the recording mechanism. Simple slots in the supporting frame are sufficient in certain circumstances as bearings for the spindles of the guide roller 32 and the intermediate supporting roller 33, while ball bearings 35*a* are provided for the shaft of the heavier main supporting roller, since it must receive the entire force for tightly stretching the record carrier (not shown in FIG. 3). In the case of divided rollers, axle supports 35*b* can be fitted for supporting purposes between the roller portions.

Figure 4:
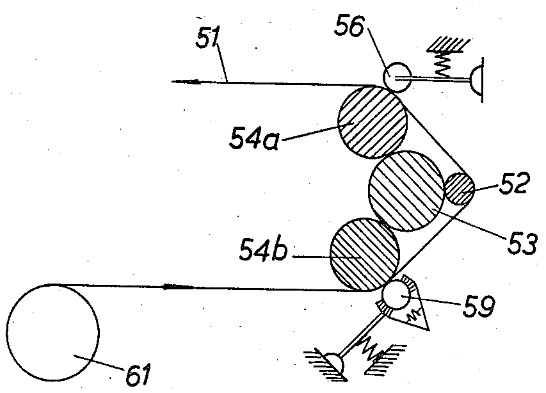
FIG. 4 is a detail sectional elevation of a third embodiment of the invention.

In order not to allow the diameter of the main supporting roller to become too large, the purpose thereof may be taken over, as shown in FIG. 4, by a pair of main supporting rollers 54*a* and 54*b* which are located symmetrically to the plane of symmetry extending from the axes of a guide roller 52 and an intermediate supporting roller 53, said main supporting rollers 54*a* and 54*b* being in contact with a record carrier at each side of the guide roller 52 and both rolling on the intermediate supporting roller 53.

In the arrangement of FIG. 4 a record carrier 51 is unwound from a supply reel 61, passes between a brake roller 59 and the supporting roller 54*b*, around the slim guide roller 52 and between a driving roller 56 and the supporting roller 54*a*. The driving roller 56 is driven by a driving motor (not shown) and a pigment carrier, recording arm and measuring instrument (also not shown) are provided as in the embodiments of FIGS. 1 and 2. The main supporting rollers 54*a* and 54*b* thus not only form a face for the record carrier but also serve to guide the record carrier. Furthermore the advantage is obtained that the main supporting roller 54*a* can directly take over the purpose of the paper drive as a driving roller by means of the motor (not shown) which is coupled thereto or to the pressure roller 56, and the other roller 54*b* can take over the purpose of braking the paper as a braking roller by means of a brake connected therewith or to the pressure roller 59. They act both on a driving side and on a driven side with the spring biased pressure rollers 56 and 59 respectively. Thus the construction of the recording mechanism is simplified in any case, because the special pressure roller, which is present in the embodiment shown in FIG. 1 is unnecessary and also the brake roller 9*a* can be omitted. In addition, the guide mechanism for the record carrier can be reduced in weight and size. FIG. 4 shows the corresponding construction with two main supporting rollers 54*a*, 54*b*, one of which drives the paper and the other brakes the paper.

The guide rollers 2, 32 and 52 of the three embodiments respectively and the corresponding supporting rollers 34, 54*a*, 54*b* (where present) may have flanges at both ends for laterally guiding the record carrier.

In further embodiments of the invention the pigment carrier may be dispensed with and warm recording (i.e. recording in which the recording arm or pointer is heated to produce a directly visible melted trace) on a heat-sensitive wax or wax-like layer on the record carrier.

Apparatus according to the invention has the advantage that it does not involve any appreciable increase in cost of construction.

I claim:

1. In a recording apparatus for registering variations in a variable quantity: the combination comprising a frame, a slim guide roller journalled in said frame, means for traversing a record carrier across said slim guide roller so as to bend through a sharp angle thereover, a recording arm adapted to move along said slim guide roller with said record carrier therebetween to produce a trace on said record carrier, means for so moving said recording arm responsively to said variable quantity, at least one main backing roller journalled parallel to said slim guide roller, an intermediate backing roller journalled parallel to and in between said main backing roller and said slim guide roller and in line contact therewith for transferring the transverse load of said record carrier on said slim guide roller to said main backing roller, said backing roller having a substantially larger diameter than said guide roller.

2. The combination according to claim 1 in which at least one of said rollers has a flange at each end for laterally guiding said record carrier.

3. In recording apparatus for registering variations in a variable quantity; the combination comprising a frame, a guide roller journalled in said frame, means for traversing a record carrier across said guide roller so as to bend through a sharp angle thereover, a recording arm adapted to move along said guide roller with said record carrier therebetween to produce a trace on said record carrier, means for so moving said recording arm responsively to said variable quantity, a main backing roller journalled parallel to said guide roller, an intermediate backing roller journalled parallel to and in between said main backing roller and said guide roller and in line contact therewith for transferring the transverse load of said record carrier on said guide roller to said backing roller, said intermediate backing roller being of substantially larger diameter than said guide roller and said main guide roller being of substantially larger diameter than said intermediate backing roller.

4. The combination according to claim 3 wherein said means for traversing the record carrier comprises a driving roller journalled parallel to said main backing roller, means for biasing said driving roller towards said main backing roller with the record carrier therebetween, means coupled to at least one of the two last-mentioned rollers for rotating said rollers, a brake roller journalled parallel to said main backing roller, and means for biasing said brake roller towards said backing roller with said record carrier therebetween.

5. The combination according to claim 3 wherein at least one of said backing rollers includes a shaft and axially spaced apart roller portions on said shaft.

6. The combination according to claim 5 wherein said main backing roller includes said shaft and a determinable number of said axially spaced apart roller portions on said shaft and said intermediate backing roller includes a shaft and a comparatively larger number of axially spaced apart roller portions on the latter said shaft.

7. The combination according to claim 6 wherein the said frame includes at least one support engaging the shaft of said main backing roller between adjacent portions thereof.

8. The combination according to claim 6 including a pair of supports mounted on said frame and extending parallel to said intermediate backing roller with one support at each side thereof and rigid elements on said supports extending between the roller portions of said intermediate backing roller to each side of said guide roller to minimize any lateral deflection thereof.

9. The combination according to claim 4 wherein said intermediate backing roller has a plurality of circumferentially extending grooves.

10. The combination according to claim 9 including a pair of supports mounted on said frame and extending parallel to said intermediate backing roller with one support at each side thereof and fingers attached to said supports and extending into said grooves of said intermediate backing roller to clean said grooves.

11. The combination according to claim 3 further comprising means for supporting, traversing and tensioning a pigment carrier between said guide roller and said recording arm with a pigmented face of said pigment carrier facing said record carrier.

12. In recording apparatus for registering variations in a variable quantity: the combination comprising a frame, a guide roller journalled in said frame, means for traversing a record carrier across said guide roller so as to bend through a sharp angle thereover, a recording arm adapted to move along said guide roller with said record carrier therebetween to produce a trace on said record carrier, means for so moving said recording arm responsively to said variable quantity, an intermediate backing roller journalled parallel to said guide roller and in line contact therewith at the opposite side thereof to said recording arm, said guide roller having a diameter which is small relative to that of said intermediate roller, a pair of spaced parallel main backing rollers, and support means supporting said main backing rollers symmetrically disposed about the plane defined by the axes of said guide roller and of said intermediate backing roller and in line contact with said intermediate backing roller which thereby serves to transfer the transverse load of said record carrier on said slim guide roller to said pair of backing rollers.

13. The combination according to claim 12 wherein said means for traversing the record carrier comprises a driving roller journalled parallel to said main backing roller, means for biasing said driving roller towards one of said pair of main backing rollers with the record carrier therebetween, means coupled to at least one of the two last-mentioned rollers for rotating said rollers, a brake roller journalled parallel to the other of said pair of main backing rollers and means for biasing said brake roller towards said other main backing roller with said record carrier therebetween.

14. A combination according to claim 12 further comprising means for supporting, traversing and tensioning a pigment carrier between said guide roller and said recording arm with a pigmented face of said pigment carrier facing said record carrier.

References Cited in the file of this patent

UNITED STATES PATENTS

| | | |
|---|---|---|
| 1,267,631 | Chipman | May 28, 1918 |
| 1,820,088 | Parker et al. | Aug. 25, 1931 |
| 2,334,109 | McBain et al. | Nov. 9, 1943 |
| 2,625,459 | John et al. | Jan. 13, 1953 |